UNITED STATES PATENT OFFICE 2,221,914

N-ACYLURETHANES AND THEIR MANUFACTURE

Kurt Engel, St. Louis, France, and Kurt Pfaehler, Basel, Switzerland, assignors to the firm J. R. Geigy A. G., Basel, Switzerland No Drawing. Application July 1, 1938, Serial No. 217,019. In Switzerland July 12, 1937

8 Claims. (Cl. 260—470)

According to the present invention a class of new, technically valuable compounds is obtained by treating urethanes of the formula

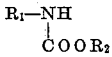

with fatty acids, their halides, esters and anhydrides to form substituted urethanes of the formula

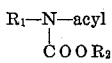

In these formulae $R_1$ means an aliphatic or hydroaromatic radical which may be substituted, $R_2$ means an alkyl, aralkyl, cyclo-alkyl or aryl radical which may be substituted or not, and acyl means the radical of a saturated or unsaturated carboxylic acid, which may also contain heteroatoms or heteroatom-groups, such as —O—, —S—, —N—, and which may further be substituted and especially may contain water-solubilizing groups or exchangeable halogen atoms.

For all three substituents, $R_1$, $R_2$ and acyl, the condition stands that at least one must be an aliphatic or alicyclic high molecular radical, i. e. must contain more than 8 carbon atoms.

The urethanes serving as primary materials are made in known manner, for instance from the carboxylic acid amides by Hofmann's decomposing process in alcoholic solution or from primary aliphatic or hydroaromatic amines by decomposition with appropriate carboxylic acid derivatives. As examples the following urethanes may be mentioned:

Undecyl carbamic acid methyl, ethyl, propyl, butyl, amyl ester, heptadecylcarbamic acid ethyl or amyl ester, urethanes respectively, made from the carboxylic acids of the naturally occurring or hydrogenated fats or oils, such as for example palm nut oil fatty acid, coconut oil fatty acid, soyabean oil fatty acid, hydrogenated codliver oil fatty acid or fatty acids of resins or aliphatic compounds such as naphthenic acid, carboxylic acids of camphor, of fenchone, methyl carbamic acid methyl, butyl, decyl, undecyl, dodecyl, octodecyl and oleic ester.

Generally all halides, esters and anhydrides of organic carboxylic acids are adapted for the acylation of the above named urethanes, such as for instance acetic, propionic, butyric, stearic, palmitic, phenoxyacetic, phenylamino- and -thioacetic acid, dodecylthioacetic acid, octylthiopropionic acid and benzoic acid. The carboxylic acid derivatives with exchangeable halogen atoms have proved to be of special advantage, for instance the halides, anhydrides or esters of α-halogen fatty acids, such as the mono- and di-chloro-acetic acid, bromosuccinic acid, α-bromo-lauric acid; but aliphatic carboxylic acid derivatives, substituted in other positions by halogen or other organic carboxylic derivatives have also proved to be quite suitable. As examples may be mentioned the chlorides of the benzylchloride-4-carboxylic acid, of the 2-chlorobenzoic acid and its substitution products, such as the 2-chloro-1-benzoic-5-sulphonic acid.

The acylurethanes obtained with the above mentioned halogenated carboxylic acid derivatives can be used for numerous exchanging reactions due to the exchangeable halogen atoms. They may for instance be replaced by monovalent atom groupings, such as —OR, —SR, —NR_2, R generally meaning inorganic and organic substituents which may be the same or different (if two are present), as explained fully further on.

The group —OR may be hydroxy, —O.SO_2H, or the radicals of aliphatic, hydroaromatic, aliphatic-aromatic or aromatic hydroxy compounds, such as of methyl-, ethyl-, benzylalcohol, cyclohexanol, phenols, phenol sulphonic acids. The organic hydroxy compounds are used in the best manner as alkali compounds for reaction. As examples for this sub-group of the new acyl-urethanes are named the reaction products of N-chloraceto-N-undecyl carbamic acid methyl-ester and sodium phenolate, of N-chloraceto-N-heptadecyl carbamic acid ethylester and the monosodium salt of glycerol.

The group —SR may be the inorganic radicals —SH, —S_2O_3H, —SO_3H, radicals of mercaptans. These compounds can be made by decomposition of the halogen acyl urethanes with alkalimono- and -polysulphides, thiosulphates, sulphites or the alkali compounds of the mercaptans. Of the latter compounds may be named for instance ethyl, dodecyl, phenyl, benzyl mercaptan, mercapto acetic acid, α-mercapto benzthiazole. As examples for this sub-group are named the reaction products of N-chloraceto-N-lauryl carbamic acid methylester with sodium thiophenolate, sodium sulphhydrate, thiosulphates, sulphites.

Finally, the group —NR_2 may be the primary or secondary amino group. As examples of suitable N-compounds for the decomposition are named ammonia, mono- and dimethyl- or -ethyl-amine, mono- or diethanolamine, aminoacetic acid and derivatives, amino ethanesulphonic acid, primary and secondary aromatic amines such as aniline and substitution products, piperidine and so forth. As examples for this sub-group of the new acylurethanes are enumerated: the reaction products of N-chloraceto-N-heptadecyl carbamic acid alkylesters with dimethylamine, taurin and so forth.

On the other hand the water-solubility may be produced by the use of compounds introducing the $SO_3H$-group, such as sulphite, formaldehyde-sulphite, thiosulphate, aliphatic, aromatic or hydroaromatic genuine sulphonic acids bearing hydroxy and amino groups, such as hydroxy- or amino-ethanesulphonic acid, phenolsulphonic acid, sulphanilic acid. In some cases the solubility in water is yielded by after-sulphonation or according to other known methods of analogous cases. There are for instance obtained genuine sulphonic acids or sulphuric acid esters, the latter if aliphatic bound hydroxy groups are present, such as for instance in the radicals of glycol, glycerol, ethanolamine and hydroxyaceto radical.

The new compounds, so far as they are insoluble in water, may be used as softening agents and in the caoutchouc industry. The water soluble new compounds show in aqueous solution distinct properties of capillary activity such as a good foaming, wetting, dispersing and emulsifying power. They are also partly excellent softening agents for cellulose regenerate. Finally some of the new products may be used as bactericidal and fungicidal agents.

Generally the new acyl urethanes are made by reaction of urethanes in the presence of heat with fatty acid halides or halogen fatty acid halides, if necessary in presence of inert diluents, such as benzene, toluene, xylene. The acylation may also be carried out in presence of acid-binding agents, such as pyridine, diethylaniline, etc.

Hereafter some explanatory examples of the process of the present invention are given, without limiting, however, the scope hereinbefore indicated, the parts being by weight.

*Example 1*

23 parts of undecylcarbamic acid methylester, made for instance by treating undecylamine with chlorocarbonic acid methylester by known method, are dissolved in 100 parts of toluene, 19 parts of phenoxyacetic acid chloride are allowed to drop in while stirring and heated to boiling for 12 hours. After working up in known manner, the N-phenoxyaceto-N-undecyl-carbamic acid methylester is obtained in form of a semi-solid mass.

The same compound is obtained by reaction of the N-chloraceto-N-undecyl-carbamic acid methylester with phenol.

*Example 2*

23 parts of undecylcarbamic acid methylester are dissolved in 100 parts of toluene, 13 parts of chloracetic acid chloride are allowed to drop in whilst vigorously stirring and boiled for 12 hours. After expelling the solvent and the excess of the acid chloride, the N-chloraceto-N-undecyl-carbamic acid methylester is obtained in the form of a yellow-brown thick oil. This compound is treated in alcoholic solution with alkali phenolate by heating for 3–4 hours and after working up in the usual manner the N-phenoxy-aceto-N-undecyl-carbamic acid methylester is obtained in form of a semi-solid mass.

For imparting water-solubility thereto, the following sulphonation may be made in this case: 20 parts of the N-phenoxy-aceto-N-undecyl-carbamic acid methylester are added to 40 parts of sulphuric acid of 100% strength at 10° C. whilst stirring, then 5 parts of oleum of 66% strength are added at —5–0° C. After stirring for 1–2 hours below 10° C., the sulphonation is complete. A sample introduced into water proves to be completely soluble. The reaction mass is poured on ice and neutralized by adding caustic soda lye. By evaporating the sodium salt is obtained in the form of a white powder, soluble in water, the solution of which shows an excellent property of capillary activity.

Instead of the aforesaid undecyl-carbamic acid methylester, similar compounds may be used, for example the heptadecyl-carbamic acid ethylester, the undecyl-carbamic acid butylester, as acid chlorides for example butyric acid chloride, propionic acid chloride. The final products show similar properties.

*Example 3*

38 parts of N-chloraceto-N-heptadecyl-carbamic acid methylester, made for instance as described in Example 2 by reacting chloracetic acid chloride with heptadecyl-carbamic acid-methylester, which on its part is obtained directly by the Hofmann decomposing process of the technical stearic-palmitic acid amide mixture in methyl-alcohol, are added to a solution of 20 parts of anhydrous sodium sulphite in 80 parts of water and boiled for 15 hours while well stirring. On cooling the reaction mass is extracted with benzene, if necessary, to remove the non-reacted parts of the reaction components. On evaporating under reduced pressure the separated aqueous layer, the salt of the sulphonic acid is obtained in form of a white powder, being a softening agent for cellulose fibres. It is clearly soluble in water; the solutions show excellent properties of capillary activity.

*Example 4*

30 parts of N-chloraceto-N-heptadecyl-carbamic acid methylester are heated in a solution of 150 parts of alcohol with 47 parts of dehydrated sodium thiosulphate for 15 hours. After filtering and cooling the sodium salt precipitates in form of a yellowish-white crystal mass, clearly soluble in water.

*Example 5*

11 parts of mercapto benzene are dissolved in 40 parts of alcohol and 4 parts of sodium hydroxide are added. Then 35 parts of the N-chloracetylate, made from hydrogenated fish oil over the carbamic acid methylester, are added and boiled for 4 hours. On working up in the usual manner, the corresponding N-phenylthio-aceto derivative is obtained in form of a semi-solid mass.

The same compound may also be made on starting with the phenylthioacetic acid chloride.

*Example 6*

23 parts of the urethane obtainable from methylamine and the chloro-formic acid ester of the technical dodecyl alcohol are dissolved in 100 parts of toluene, 13 parts of chloracetylchloride are allowed to drop in while stirring and heated for 12 hours to boiling. After expelling the solvent and the excess of the acid chloride, the N-chloraceto-N-methyl-carbamic acid dodecylester is obtained in form of a thick oil.

38 parts of N-chloraceto-N-methyl-carbamic acid dodecyl ester are added to a solution of 20 parts of anhydrous sodium sulphite in 100 parts of water and boiled for 15 hours while stirring. On cooling the reaction mass is extracted with benzene, if necessary, to remove the non-reacted parts of the reaction components. On evaporating the separated aqueous layer under reduced pressure, the salt of the sulphonic acid is obtained in form of a white powder, showing excellent properties of capillary activity.

*Example 7*

23 parts of undecyl carbamic acid methylester are dissolved in 100 parts of toluene, 16 parts of sulpho-acetic acid chloride, made from sulphoacetic acid and thionyl chloride at room temperature, while distilling off the excess of $SOCl_2$ under reduced pressure at 40–50° C., are allowed to drop in and the whole is heated for 12 hours. On expelling the solvent, the mass is neutralized by addition of sodium hydroxide. By evaporation of the aqueous solution the sodium salt is obtained in form of a white powder, soluble in water, the solutions of which show excellent properties of capillary activity.

In place of the reaction components used in the above examples, other possibilities of variation may be exercised in very great number by use of the particular compounds as mentioned above in the general description of the specification. There may only be named the reaction of methyl carbamic acid methylester with chlorides of higher fatty acids, such as oleic acid chloride, α-bromolauric acid chloride; the resulting N-acyl-urethanes may be sulphonated in the aforesaid manner, treated with ammonia derivatives and alkylated, if necessary.

What we claim is:

1. A process for the production of N-acylurethanes containing sulphonic acid groups, comprising treating urethanes of the formula

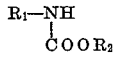

wherein $R_1$ means one of the group consisting of alkyl and cycloalkyl radicals and $R_2$ means one of the group consisting of alkyl, benzyl, cycloalkyl and phenyl radicals with acylating agents to form the N-acylurethanes of the following formula

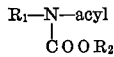

wherein acyl means the acyl radical of a carboxylic acid, whereby at least one of the groups $R_1$, $R_2$ and acyl must be one of the group consisting of alkyl and cycloalkyl radicals containing more than 8 carbon atoms, the reaction components being so selected that at least one sulphonic acid group is present in the final product.

2. N-acylurethane sulphonic acids of the following formula

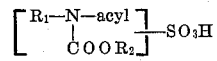

wherein $R_1$ means one of the group consisting of alkyl and cycloalkyl radicals and $R_2$ means one of the group consisting of alkyl, benzyl, cycloalkyl and phenyl radicals, wherein acyl means the acyl radical of a carboxylic acid, whereby at least one of the groups $R_1$, $R_2$ and acyl must be one of the group consisting of alkyl and cycloalkyl radicals containing more than 8 carbon atoms, said products being valuable assistants for the textile and related industries.

3. N-acylurethane sulphonic acids according to claim 2, whose acyl radicals contain the sulphonic acid group.

4. N-acylurethane sulphonic acids of the following formula

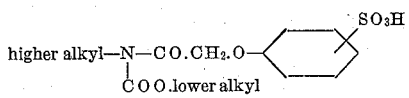

wherein higher alkyl means an alkyl radical having more than 8 carbon atoms and lower alkyl means an alkyl radical with a carbon atom number lower than 8.

5. N-acylurethanes of the following formula

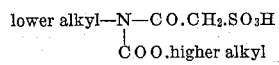

wherein higher alkyl means an alkyl radical having more than 8 carbon atoms and lower alkyl means an alkyl radical with a carbon atom number lower than 8.

6. The acylurethane which in the form of its acid is represented by the formula

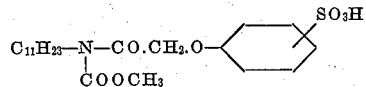

being in the form of the sodium salt a white powder, soluble in water, the solution of which shows an excellent property of capillary activity.

7. The acylurethane which in the form of its acid is represented by the formula

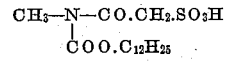

being in the form of the sodium salt a white powder, soluble in water, the solution of which shows an excellent property of capillary activity.

8. The acylurethane which in the form of its acid is represented by the formula

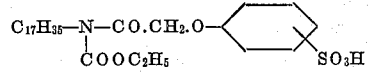

KURT ENGEL.
KURT PFAEHLER.